Patented June 11, 1946

2,401,755

UNITED STATES PATENT OFFICE 2,401,755

TEXTILE PRINTING

Ira L. Griffin, Dave E. Truax, and Norman H. Nuttall, Charlotte, N. C., assignors to Stein, Hall & Company, Inc., New York, N. Y., a corporation of New York No Drawing. Application February 12, 1941, Serial No. 378,564

16 Claims. (Cl. 106—209)

This invention relates to the art of printing dyes on textiles, more particularly to the art of printing pigment dyes and to pigment dye printing pastes and printing gums or printing thickeners. The invention especially contemplates a method of printing and the preparation of printing gums, or printing thickeners, and printing pastes in which a permanent finish is imparted to the textile fabric simultaneously, concurrently or contemporaneously with the formation of the print or as a part of the general operation of printing.

Several different general methods are employed in textile printing. Probably the most extensive textile printing at the present time is done with cylinder or roll printing machines. The fundamental principles in this process are simple and comprise passing the cloth to be printed under some tension and pressure over an intaglio metal roll, the engraving of which is filled with a printing paste. After leaving the printing machine, the printed cloth is normally passed into or onto a drier. This dries the printing paste on the cloth in its proper place and prevents the dye from spreading to other portions of the fabric with consequent ruination of the design. In the event the paste contains a resin then the driers serve the added purpose of curing.

The printing paste supplied to the cloth from the roller is a material thickened to such an extent that it does not migrate readily after being applied to the cloth. It varies with different fabrics and manufacturers. It will also vary depending upon the type of dye being employed. For example, in printing vat dyes it is customary to incorporate into the printing paste a reducing agent such as sodium formaldehyde sulfoxylate and an alkali, the reducing agent in the presence of the alkali, moisture and heat causing the vat dye to be reduced to its leuco form. Subsequently the leuco form of the dye is oxidized in order to reconvert it to the dye and to fix the dye on the fiber.

The insoluble azo colors, or ice colors, are not offered to the dyer and printer in the usual sense but are produced locally on the fiber by the combination of their constituents. When certain aromatic amines are diazotized and coupled with suitable coupling components well known in the ice color art, insoluble dye pigments are obtained which possess good fastness properties. According to one method employed, cotton material is prepared for the subsequent printing operation by impregnating or padding with a solution of an alkaline naphtholate and carefully drying. The prepared material is then printed with a thickened diazo solution, the color being almost instantaneously formed by the reaction between the diazo solution and the naphthol. The printed material is rinsed in cold water, soaped, rinsed and dried.

The printing of insoluble azo colors may also be accomplished by preparing a printing paste from a sodium salt of nitrosamine, caustic soda, a suitable naphthol, sodium chromate and a thickening agent. The mixture of the nitrosamine sodium salt and the alkaline naphtholate is fairly stable in the presence of free alkali. In an acid medium, however, the nitrosamine is converted to the active diazo salt which immediately couples with the naphthol to form the insoluble azo color. After application of the nitrosamine printing paste, the goods are dried, aged in a continuous acid ager, rinsed, soaped, rinsed and dried.

Still another type of printing operation involves the preparation of a printing paste containing a water soluble diazoimino compound, an ice color coupling component, a wetting out agent or solvent, an alkaline reacting substance, a thickening agent and an acid upon heating. The use of wetting out agents is optional and ordinarily only small amounts of alkalies are employed. After printing the printed fabric may be dried in the air and aged in the usual manner but without an acid. The material is then rinsed in cold water, soaped, again rinsed and dried.

Recently still a further type of printing operation has become of increasing importance. This involves the use of so-called pigment dyes. The pigment dyes are applied to the fabric in the usual manner, but the printing paste differs somewhat from other types of printing pastes in that the vehicle contains a synthetic resin which is polymerizable by heat and can be converted into an insoluble state by heating after printing. The synthetic resin assists in holding the dye pigment on the fiber.

In preparing dye compositions for printing the printing paste is usually prepared by mixing a dye paste or pastes with the other ingredients. The printing gum is one of the other ingredients which is included in the printing paste. This printing gum normally comprises a gum such as, for example, British gum or gum tragacanth, which may also be mixed with a thickening agent such as starch. The dye pastes are essentially finely divided suspensions of dye with or without a dispersing agent. These dye pastes (hereinafter referred to as "dye pastes," "dyestuff pastes" or "color pastes") usually have the dye suspended in water, although an organic vehicle may be employed.

One of the objects of the present invention is to provide new and improved dye pastes, new and improved printing gums, and new and improved printing pastes which are especially useful in dyeing or coloring and particularly in printing textiles, paper or other material.

Another object of the invention is to provide a new and improved method and new and improved compositions for dyeing and coloring textile materials while simultaneously imparting thereto a permanent finish.

Still another object of the invention is to provide a new and improved method of printing and new and improved printing pastes for printing the pigment type dye. Other objects will appear hereinafter.

These objects are accomplished in accordance with this invention by employing, in conjunction with the printing and dyeing of materials, a water dispersible, or hydrophilic, film forming binder or thickening agent, preferably an amylaceous substance, a natural gum, or a reactive synthetic material e. g., polyvinyl alcohol and a fixing agent reactive with said binder or thickening agent to render it water insoluble, or hydrophobic, upon drying or dehydrating the material, preferably assisted by heating after or during the course of the printing or dyeing operation. The fixing agent for the purpose of the present invention may be, for example, an antimony compound, preferably potassium pyroantimonate.

In the practice of the invention the fixing agent, e. g., potassium pyroantimonate, may be incorporated or mixed with the dye in either powder or paste form, or it may be incorporated or mixed with a dry binding agent such as a starch, a modified starch, a dextrine, a natural gum, or a reactive synthetic material, e. g., polyvinyl alcohol. The fixing agent may also be incorporated with the printing gum, that is to say, the gummy mixture obtained by dispersing a starch, a gum or both in water. Alternatively, the fixing agent may be added to the printing paste, that is, the composition which results when the dye powder or paste, or a dye in some dispersed form, is mixed with the printing gum. It may be cooked with the thickener and supplied to some users in paste form.

The fixing agent may be applied in a separate phase from the application of the dye, it may be applied in the same phase as the application of the dye, or it may be applied in the same and also in a separate phase. The same, or a different binding agent such as starch, a natural gum, a polyvinyl alcohol or other material having the properties previously described which is capable of being insolubilized or rendered hydrophobic by the fixing agent may also be employed in the dyeing operation or in the after-treatment of the dyed or printed material. For example, the fixing agent and starch, or other reactive binder, may be added to the dye bath in the "slasher."

In some instances it has been found that there is a tendency for compositions containing both the binding agent and the fixing agent e. g., potassium pyroantimonate, to become rubbery before being applied, particularly if the composition is allowed to set any length of time. In making such compositions as printing gums, moreover, if an amylaceous substance such as a starch or a modified starch is employed it is often desirable to cook the starch in order to disperse it and cooking a starch in the presence of a fixing agent such as potassium pyroantimonate sometimes causes it to gel during cooking.

The concentration of the starchy material influences the amount of jelling. The same is true of the temperature and time of cooking. The cooking should preferably be controlled. One preferred method is to heat the starch containing the fixing agent in the presence of water to a temperature of about 180° F. to about 185° F. and then stop the heating as soon as this temperature is reached. If prolonged heating at 180° F. to 185° F., or a higher temperature, is employed in cooking, the paste is more likely to gel. Jelling is more pronounced in the case of thick starches. Sometimes it is desirable to employ a mixture of starches, one or more of which gels less readily than the others. The cooking of the starch with the potassium pyroantimonate is advantageous in that it has a tendency to produce a product with an increased body. Thus, by cooking the starch with potassium pyroantimonate, the amount of starch employed may be, say, 5 to 8 ounces per gallon of water, while in the absence of potassium pyroantimonate, 12 to 16 ounces of starch per gallon of water may be required to obtain the same body or viscosity. Additional amounts of potassium pyroantimonate, or other fixing agent, may be added after the starch has been cooked.

The invention will be further illustrated but is not limited by the following examples, in which the quantities are stated in parts by weight unless otherwise indicated:

*Example I*

A printing gum was prepared by cooking a modified starch with water in the proportion of approximately 8 ounces of starch per gallon of water, together with about 3% of potassium pyroantimonate, based on the weight of the starch. The resulting printing gum, therefore, contained a weight ratio of 170.1 parts of modified starch to 5.1 parts of potassium pyroantimonate in 3782 parts of water.

This printing gum was then mixed with a dye in the weight ratio of 100 parts of printing gum to 5 parts of 20% pigment color paste (i. e. containing 20% dye). The amount of potassium pyroantimonate, based upon the weight of the dye, was around 12.7%.

Any typical pigment type of dye may be employed, as, for example, a phthalocyanine type of dye, or a lake pigment formed by precipitating a dye on an inert pigment. The dye may be added either in a powder or paste form. After the fabric (e. g. cotton) is printed from an intaglio roll, a silk screen, or other known type of printing means, it is dried by heating to a temperature within the range of about 220° F. to 330° F. Steaming or aging of the print is unnecessary.

*Example II*

A printed textile, printed as described in Example I, was subjected to an after-treatment by padding and drying with a finishing composition made by cooking a modified starch with water in the proportions of about 4 ounces of gum per gallon together with about 8% of potassium pyroantimonate based on the weight of the gum. An excellent permanent finish was obtained.

*Example III*

The printed material of Example I was subjected to an after-treatment before being completely dried by passing it through a solution containing about 0.25% to about 1% of potassium pyroantimonate. The resultant material was then dried to a moisture content less than about 2%. An excellent finish was obtained.

Example IV

The material was printed, as described in Example I, except that the potassium pyroantimonate was omitted from the printing paste. After the material had been printed it was passed through a solution containing about 0.25% to about 1% of potassium pyroantimonate. The resultant material was then dried to a moisture content less than about 2%. An excellent finish was obtained.

Example V

This example is given to illustrate the application of the invention to a dyeing operation as distinguished from a printing operation. A typical composition which may be used for dyeing may be prepared as follows:

Six (6) ounces of a modified starch are mixed with 4% potassium pyroantimonate, based on the weight of the starch and dispersed in a gallon of water. To the dispersed mixture are then added 10 parts of color pigment to every 200 parts of the dispersion. The resultant dye dispersion is then employed in dyeing textile fabrics by immersion, padding or any other suitable method, and the material, after being dyed, is dried to a moisture content less than 2%, the drying operation being effected at a temperature initially above about 180° F. and below about 330° F.

In making up dye compositions of the type described the potassium pyroantimonate may be blended with the binder, or the potassium pyroantimonate may be added to the dye and the dye containing it may be added to the cooking kettle in which the binder is dispersed, or a solution of the potassium pyroantimonate may be added to the gum or starch while the latter is being dispersed.

Example VI

Any printed or dyed material may be given an after-treatment in accordance with the invention by applying thereto a finishing composition of which the following are typical:

(a) Four ounces of modified starch cooked and dispersed with 8% of potassium pyroantimonate based on the weight of the starch in one gallon of water;

(b) Sixteen ounces of a modified starch known as thin boiling #40 cooked and dispersed in a gallon of water with the addition of 0.5% of potassium pyroantimonate, based on the weight of the starch. The finishing treatment may be applied to the fabric by immersion, dipping or in any other suitable manner, and if desired, a further treatment may be given by passing the fabric or material containing the finishing composition through a bath containing about 0.25% potassium pyroantimonate. If this further treatment is applied, it is preferable to treat the fabrics with the solutions after they have been finished and before being dried, but they may also be after-treated after having been dried, in which event they are re-dried.

An after treatment may be given to the fabric by spraying a solution of fixing agents, e. g., potassium pyroantimonate on the cloth after the application of starch or other binding agent (with or without the potassium pyroantimonate) prior to completion of the drying operation. For example, the cloth leaving the printing machine may be sprayed before reaching the drying cans, or any other intermediate drying operation regardless of whether cans, hot air or other drying method is used. The potassium pyroantimonate solution may also contain an auxiliary agent, as, for example, antimony fluoride, sodium silico fluoride, or other agent having a modifying or thinning action on the binding agent.

The foregoing examples are intended to be illustrative and not limitative. It will be understood that the exact compositions of the printing paste may vary somewhat, depending upon the particular type of dye employed. Any of the known pigment types of dyes may be employed, including vat dyes, Heliogen, Lithosol colors and Monastral colors. The latter type of dye is known technically as a phthalocyanine dye and has a very high tinctoral power as well as excellent fastness to light. The invention is also applicable to printing and dyeing operations with dyes other than the pigment type of dyes, as, for example, those printing and dyeing operations which have previously been discussed herein.

In practicing the invention it is preferable to employ a starch or a starch degeneration product as the binding agent. By a starch degeneration product is meant a derivative of starch such as may be obtained by the various processes of making thin boiling and so-called modified starches and dextrines. In general, especially good results have been obtained with specially modified starches. If desired, mixtures of undegenerated and degenerated starches may be used. Starch degeneration products of a predominantly starchy nature are preferable to the more highly dextrinized starches, because after a certain degree of disorganization of the starch it usually requires a much larger percentage of the fixing agent, e. g., a water soluble pyroantimonate, to bring about fixation, water insolubilization, or a hydrophobic state of the starch. Among the suitable starchy materials may be mentioned wheat, rye, barley, oat, rice, corn and potato starches, sago and cassava flours and colloidal modifications thereof, and other starches and flours and derivatives thereof. Among the natural gums which may be employed may be mentioned particularly locust bean gum, gum tragacanth and other water dispersible, film forming natural gums. Of the water dispersible synthetic film forming substances, special mention may be made of polyvinyl alcohols.

The fixing agents which have been found to be preferable for the purpose of the present invention are antimony compounds capable of converting water dispersible, polyhydroxylated, film forming substances from a hydrophilic to a hydrophobic state. The antimony compounds which have been found to be especially suitable are those in which antimony is present in its pentavalent state. Certain antimony compounds are of less value for the purpose of the present invention, as, for example, antimonous oxide ($Sb_2O_3$) and sodium antimonate. These compounds are better when freshly precipitated. Tartaremetic has some effect. Larger amounts of the trivalent antimony compounds are apparently required.

Of the fixing agents, potassium pyroantimonate is of principal importance. It occurs in two modifications, namely the acid salt ($K_2H_2Sb_2O_7$) and the neutral salt ($K_4Sb_2O_7$). Up to the present time the material which is available commercially is what is called "re-agent material" which is largely acid salt, although it contains some neutral salt. Antimonic oxide (Sb$_2$O$_5$) may also be employed as the fixing agent. A product obtained by dissolving antimony metal in excess concentrated nitric acid which was apparently the acid H$_3$SbO$_4$ also acted as a fixing agent. It was further observed that when potassium pyroantimonate and antimony tri-fluoride were mixed together or when potassium pyroantimonate and antimony lactate were mixed together, the resultant precipitate could be employed as a fixing agent for the water soluble film forming component of the composition.

In all cases the binding agents found to be suitable for the purpose of the invention have been polyhydroxylated compounds which form colloidal dispersions in water and are capable of forming continuous films. For the most part these materials are carbohydrates or polysaccharides hydrolyzable by acids to simpler molecular compounds.

In practicing the invention it has been found that as previously indicated the addition of an auxiliary agent, particularly an agent capable of thinning starches, that is, of decreasing their viscosity in aqueous dispersions, may be advantageous in order to prevent jelling or too rapid reaction by the fixing agent on the starch. The same considerations apply to other water dispersible film forming substances which may be employed in accordance with the invention. The addition of the auxiliary agents is desirable in some finishing compositions. Generally speaking, the auxiliary agent may be any compound or salt having a thinning action on the binding agent which has a pH or develops a pH within the range of about 3.5 to about 9.5. Among the salts or other compounds which may be employed are, for example, sodium silico fluoride, antimony trifluoride, ammonium oxalate, sodium perborate, sodium persulphate, citric acid, lactic acid and acetic acid. Enzymes may also be added to produce a thinning action. Some of these salts such as, for example, antimony trifluoride, have some fixing value. Others, such as ammonium oxalate, are illustrative of salts which become acidic on heating. Other salts, such as sodium perborate and sodium persulphate, derive their thinning action from their oxidizing properties. The free acids, such as citric acid, lactic acid and acetic acid are capable of thinning starches without breaking them down too much. If the pH is too low, the starch may be broken down so much as to require a relatively large amount of the fixing agent. Likewise, the strongly acidic condition may adversely affect the cloth which is being printed. If the pH is too high, the desired fixing action either does not occur or is greatly reduced, particularly as to the pentavalent antimony compounds. The latter are more reactive on the acid side while some of the trivalent antimony compounds, such as tartaremetic, seem to have a fixing action on the alkaline side.

Thickeners prepared by heating the modified starch or other similar material with the fixing agent to a temperature of say, 180° F. to 185° F. and then immediately withdrawing the heat and allowing the paste to cool sometimes gel but are "thixotropic," that is to say, the gel can readily be broken by mechanical action. In printing it is preferable to prepare the paste in this manner then immediately cool and print. For warp sizing it is customary to employ the sizing composition at a temperature of 190° F. to 200° F.

For finishing, the temperature employed is customarily from about room temperature to 180° F. In warp yarn dyeing, the fixing agent, with or without a binding agent, may be added in the warp box or in an added box. The dyeing may be effected in the same operation used to size the yarn prior to weaving.

The proportions and concentrations of the various materials may vary rather widely, depending upon the type of treatment and upon the type of material being treated, as well as upon other factors. The amount of fixing agent, as, for example, potassium pyroantimonate, is preferably within the range of about 0.25% to about 25%, based upon the weight of the binder or binding agent. Thus, with locust bean gum good results can be obtained with say 1% potassium pyroantimonate on the weight of the gum while with a dextrine it may be desirable to employ 25%. If the potassium pyroantimonate is applied in a separate phase in solution form, the amount thereof is preferably within the range of about 0.01% to about 2%, based upon the total weight of the solution. If the potassium pyroantimonate or other fixing agent is added to the dye or to a paste containing the dye, the amount thereof is preferably within the range of about 1% to about 20%, based upon the weight of the dye. In the printing gum the amount of potassium pyroantimonate is preferably within the range of about 0.25% to about 5% and in a printing paste the amount of potassium pyroantimonate is preferably within the range of about 0.01% to about 1%.

The amount of the fixing agent, for example, potassium pyroantimonate, based on the weight of the starch or other reactive binder, may vary depending upon the concentration, purpose of usage and other factors. For example, the percentage of potassium pyroantimonate based on the weight of the starch, may be as high as 8% to 12% for finishing or dyeing, and as low as 0.5% for warp sizing.

A preferred type of printing composition for the purpose of the present invention may contain the following ingredients: 1 to 10 parts pigment dye paste, 3 to 12 parts binder, 0.01 to 1 part potassium pyroantimonate. Two or more of these ingredients may be blended together and then dispersed, or they may be disposed separately in water or other vehicle. The amount of water required will naturally depend to a large extent upon the type of binding agent employed and the desired consistency of the printing paste can readily be determined by those skilled in the art.

After a printing or drying operation, or other finishing operation in accordance with the invention, it is preferable to dry the resultant material to a moisture content below 5% and preferably below about 2%. It is also preferable to dry the material at a temperature of 180° F. or higher prior to the time that the moisture contained therein is lost or reduced materially. Otherwise, the fixation, permanency or insolubility of the finish may be lessened.

It will be recognized that a wide variety of auxiliary agents may be added to the compositions described herein. Among such addition agents may be mentioned natural or synthetic resins, as, for example, urea-formaldehyde resins, vinyl resins, methyl methacrylate resins and other suitable type of resins such as are normally employed in the treatment of textile materials. The proportions of these resins may also vary depending upon the type of treatment and the material treated. The resinous material may, if desired, be incorporated into the printing paste, the printing gum, the dye paste or the dye powder.

In printing work a solution of potassium pyroantimonate may also be used in a section of the soaper to provide added fastness to printed and dyed fabrics, thereby eliminating an extra operation and extra drying capacity. It will be understood that auxiliary agents and treatments which are customarily employed in the textile industry may also be employed in conjunction with printing and dyeing in accordance with the present invention. For example, after printing or dyeing in accordance with this invention, the fabric may be given a softening, weighting, back filling or stiffening treatment.

The type of material which may be printed or dyed in accordance with the invention is subject to variation, but ordinarily any textile material may be employed, as for example, cotton, linen, wool, regenerated cellulose and cellulose esters and ethers. The invention is also applicable to printing and dyeing paper or similar materials. It will be understood, of course, that different types of dyes may be required for different materials.

One of the principal advantages of the invention is that it increases the fastness of materials to washing without the necessity of employing synthetic resins and similar materials. Another advantage of the invention is that it makes use of component parts of printing pastes and printing gums and causes them to become an integral part of the finished fabric or material when ordinarily they are merely employed as thickeners to keep the dye in place until a proper design can be applied. In normal practice the printing gums or printing pastes are removed by the rinsing and soaking operations and never become an integral part of the fabric or material.

A further advantage of the invention is that it is applicable to existing methods of printing and dyeing and hence, no new equipment is required and no substantial changes in the methods of operation are involved.

One of the advantages of the invention is that printing pastes made in accordance with the invention may be printed side by side with any of the known types of printing pastes. These printing pastes may also be printed on the so-called naphthol AS prepared material, that is to say, material which has previously been impregnated with a solution of naphthol AS, or similar substance. A printing paste containing a pigment dye can be printed directly on this material in accordance with this invention without any deleterious effect due to the presence of the naphthol AS. In fact, if anything, the fastness appears to be slightly better. Diazo printing pastes containing coupling components can be printed side by side on the same material.

Another feature of the present invention is that the printings and dyeings obtained in accordance with the practice of the invention have a much less tendency to rub off onto other clothing and leave a mark (known as "crocking") than is the case with present commercial methods of pigment printing and dyeing.

The invention is valuable not only for roll printing but also for screen printing on textiles, paper or other materials.

Having thus described the invention, what we claim as new and desire to secure by Letters Patent of the United States is:

1. A textile printing composition comprising a water insoluble pigment, a hydrophilic film forming amylaceous substance and a pentavalent antimony compound.

2. A textile printing composition comprising a water insoluble pigment, a hydrophilic film forming natural gum and a pentavalent antimony compound.

3. A textile printing composition comprising a water insoluble pigment, a hydrophilic film forming polyvinyl alcohol and a pentavalent antimony compound.

4. A textile coloring composition comprising a pigment dye, a water dispersible amylaceous substance and potassium pyroantimonate.

5. In the printing of textile materials, the step which comprises printing on the textile material with a printing paste comprising a pigment, dye, a water dispersible amylaceous substance and potassium pyroantimonate.

6. In the process of preparing printed materials, the step which comprises printing on the material with a dye in the presence of an amylaceous substance and potassium pyroantimonate and drying to a moisture content less than about 2%.

7. A textile material containing a pigment dye intimately associated with a water resistant reaction product of an amylaceous substance and potassium pyroantimonate.

8. A printing composition comprising 1 to 10 parts by weight of pigment dye paste, 3 to 12 parts by weight of a water dispersible film forming amylaceous substance, and 0.01 to 1 part by weight of potassium pyroantimonate.

9. A printing composition comprising a water insoluble pigment, a hydrophilic film forming polyhydroxylated substance selected from the group consisting of amylaceous substances, natural gums and polyvinyl alcohols, and a pentavalent antimony compound, said antimony compound being reactive with said film forming substance to render it substantially hydrophobic.

10. A printing composition comprising a water insoluble pigment, a hydrophilic film forming polyhydroxylated substance selected from the group consisting of amylaceous substances, natural gums and polyvinyl alcohols, and an antimony compound selected from the group consisting of the oxides, antimonates and free acids in which the antimony exists in the pentavalent state, the proportions of said antimony compound corresponding to 0.25% to about 25% by weight of said film forming substance and being within the range of about 1% to about 20% by weight of the pigment.

11. A printing composition comprising a water insoluble pigment, a water dispersible film forming polyhydroxylated substance selected from the group consisting of amylaceous substances, natural gums and polyvinyl alcohols, and a water soluble pyroantimonate, the amount of pyroantimonate being within the range of about 0.25% to about 25% based on the weight of the film forming substance and within the range of about 1% to about 20% based on the weight of the pigment.

12. A printing composition comprising a water insoluble pigment dye, a water dispersible film forming carbohydrate material of the type hydrolyzable by acids to simpler molecular compounds and potassium pyroantimonate, the proportion of potassium pyroantimonate being within the range of 0.25% to about 25% by weight of the carbohydrate material and within the range of about 1% to about 20% based upon the weight of the pigment.

13. In the printing of textile materials the steps which comprise printing on the textile material with a printing paste comprising a dispersion of a water insoluble pigment, a water dispersible film forming polyhydroxylated substance selected from the group consisting of amylaceous substances, natural gums and polyvinyl alcohols, and an antimony compound selected from the group consisting of the oxides, antimonates and free acids in which the antimony exists in the pentavalent state, and drying said dispersion in association with said textile material to a state of substantial water insolubility.

14. In the printing of textile materials the steps which comprise printing on the textile material with a printing paste comprising a dispersion of a water insoluble pigment, a water dispersed film forming carbohydrate material of the type hydrolyzable by acids to simpler molecular compounds and a water soluble pyroantimonate, the proportion of pyroantimonate being within the range of about 0.25% to about 25% based on the weight of said film forming substance and within the range of about 1% to about 20% by weight of said pigment, and drying the resultant printed material.

15. In the printing of textiles the step which comprises printing on the textile material with a printing paste comprising a water insoluble pigment, a water dispersible film forming carbohydrate material of a type hydrolyzable by acids to simpler molecular compounds and a water soluble pyroantimonate.

16. A printed textile material substantially resistant to crocking comprising a water insoluble pigment intimately associated with the water insoluble coaction product of a hydrophilic polyhydroxylated organic substance selected from the group consisting of amylaceous substances, natural gums and polyvinyl alcohols, and a water soluble pyroantimonate, the amount of said pyroantimonate being within the range of 0.25% to 25% by weight of said film forming substance and within the range of 1% to 20% by weight of said pigment.

IRA L. GRIFFIN.
DAVE E. TRUAX.
NORMAN H. NUTTALL.

Certificate of Correction

Patent No. 2,401,755.                                                                June 11, 1946.

IRA L. GRIFFIN ET AL.

It is hereby certified that errors appear in the printed specification of the above numbered patent requiring correction as follows: Column 2, line 9, before "nitrosamine" insert *a*; column 8, line 10, for "treament" read *treatment*; line 50, strike out "disposed" and insert instead *dispersed*; column 10, line 13, claim 3, for "polyvinyyl" read *polyvinyl*; line 20, claim 5, after "pigment" strike out the comma; and that the said Letters Patent should be read with these corrections therein that the same may conform to the record of the case in the Patent Office.

Signed and sealed this 25th day of March, A. D. 1947.

[SEAL]

LESLIE FRAZER,
*First Assistant Commissioner of Patents.*